United States Patent
Bergkvist

(10) Patent No.: US 6,522,644 B2
(45) Date of Patent: *Feb. 18, 2003

(54) METHOD FOR DECORRELATING BACKGROUND INTERFERENCE IN A TIME-SYNCHRONIZED MOBILE COMMUNICATIONS SYSTEM

(75) Inventor: Bengt Bergkvist, Järfälla (SE)

(73) Assignee: Telefonaktiebolaget LM Ericsson (Publ) (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/104,339

(22) Filed: Jun. 25, 1998

(65) Prior Publication Data

US 2002/0067712 A1 Jun. 6, 2002

(51) Int. Cl.[7] .................................................. H04J 3/06
(52) U.S. Cl. ........................................ 370/350; 455/456
(58) Field of Search ................................ 370/441, 442, 370/350, 337, 347, 468, 328, 329, 336, 479, 252, 456, 440, 457, 427, 428, 423, 503; 455/456, 440, 457, 427, 428, 423, 67.1, 67.6, 226.1

(56) References Cited

U.S. PATENT DOCUMENTS

| | | | |
|---|---|---|---|
| 4,672,630 A | 6/1987 | Kaku | 375/13 |
| 5,212,689 A | 5/1993 | Eriksson | 370/106 |
| 5,390,216 A * | 2/1995 | Bilitza et al. | 370/328 |
| 5,479,444 A * | 12/1995 | Malkamaki et al. | 375/231 |
| 5,548,583 A | 8/1996 | Bustamante | 370/18 |
| 5,570,369 A * | 10/1996 | Jokinen | 370/347 |
| 5,590,133 A | 12/1996 | Billström et al. | 370/349 |
| 5,606,580 A | 2/1997 | Mourot et al. | 375/340 |
| 5,642,354 A | 6/1997 | Spear | 370/329 |
| 5,838,672 A * | 11/1998 | Ranta | 370/335 |
| 6,009,334 A * | 12/1999 | Grabeck et al. | 455/456 |
| 6,038,238 A * | 3/2000 | Jokinen et al. | 370/523 |
| 6,108,553 A * | 8/2000 | Silventoinen et al. | 455/456 |
| 6,134,230 A * | 10/2000 | Olofsson et al. | 370/337 |
| 6,201,803 B1 * | 3/2001 | Munday et al. | 370/350 |
| 6,223,040 B1 * | 4/2001 | Dam | 370/337 |

FOREIGN PATENT DOCUMENTS

| | | |
|---|---|---|
| EP | 0 767 557 A1 | 4/1997 |
| EP | 101292 | 2/1999 |
| WO | WO 96/11533 | 4/1996 |

* cited by examiner

*Primary Examiner*—Dang Ton
(74) *Attorney, Agent, or Firm*—Jenkens & Gilchrist

(57) ABSTRACT

A method and system are disclosed for decorrelating background interference signals in a time-synchronized cellular system, in which a mobile station inserts a different training sequence in each successive transmitted burst. The constantly varying background interference signal environment that results can be decorrelated at base station receivers, which enhances the reception of multiple independent mobile station transmissions, and thus increases the sensitivity and precision of time-synchronization measurements, such as, for example, time-of-arrival or time-difference-of-arrival measurements made for mobile station positioning purposes.

26 Claims, 1 Drawing Sheet

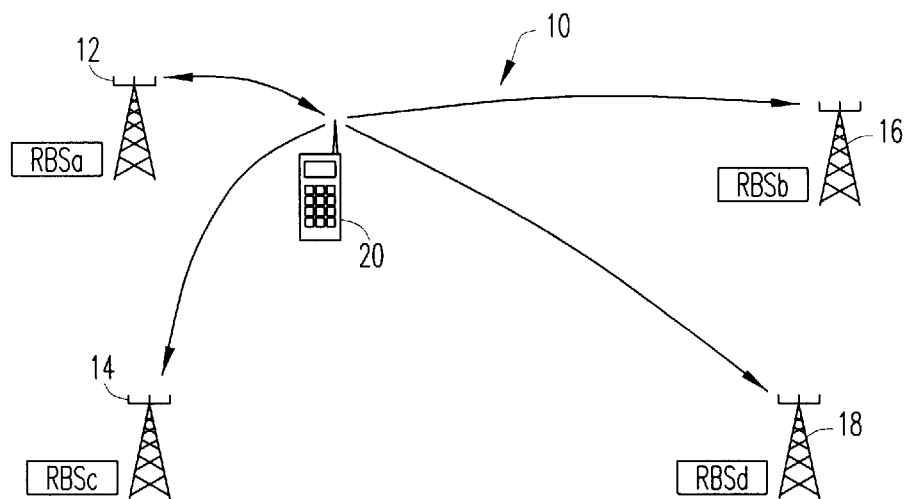
FIG. 1
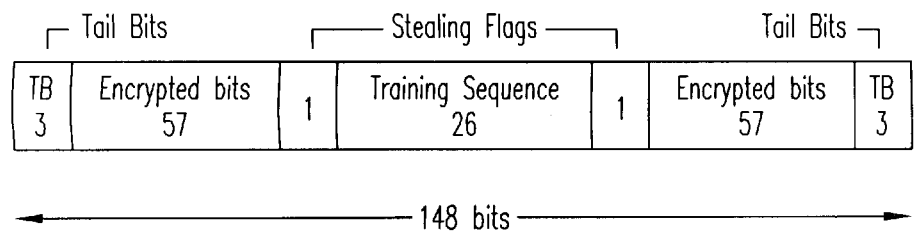
FIG. 2
1110111100010010111011100;
0010110111011110001011011;
0001101011100100000110101;
1010011111011000101001111;
0010010111000010001001011;
0100111010110000010011101;
0100011110110100010001111;
0100001110111010010000111;
```
1110111100010010111011100;
0010110111011110001011011;
0001101011100100000110101 1;
1010011111011000101001111 1;
0010010111000010001001011 1;
0100111010110000010011101 0;
0100011110110100010001111 0;
0100001110111010010000111 0;
```
FIG. 3

METHOD FOR DECORRELATING BACKGROUND INTERFERENCE IN A TIME-SYNCHRONIZED MOBILE COMMUNICATIONS SYSTEM

BACKGROUND OF THE INVENTION

1. Technical Field of the Invention

The present invention relates in general to the mobile communications field and, in particular, to a method for decorrelating background interference signals in a time-synchronized mobile communications system.

2. Description of Related Art

Synchronization in cellular communications systems is often implemented by the use of a special synchronization burst using known transmitted sequences. Time synchronization is then achieved by comparing the known transmitted sequence with the received sequence by correlation techniques, and using the correlation peak or other properties as a time reference. As such, the precision that can be obtained depends on the bandwidth available, and the noise or interference background against which the useful signal appears.

The precision of the time-synchronization process can be increased if multiple transmissions of the synchronization sequence can be demodulated at the receiver. Otherwise, somewhat degraded background interference conditions may be tolerated for a specified degree of lower precision. However, a prerequisite for obtaining higher receiver gain through the use of multiple measurements is that the measured signals not be identical. This requirement can be met if the synchronization signals appear against a noise or interference background that is decorrelated between adjacent measurements. Better measurements can also be obtained if the properties of the sources creating the interference change between measurements. However, in most practical situations, such source changes do not occur.

An important area of interest in the cellular communications field is the area related to time synchronization of bursts in time-division multiple access (TDMA) systems. During an ongoing call in a TDMA system, synchronization can be maintained by the use of training sequences included in each of the MS's transmitted bursts. In that regard, in the higher capacity cellular systems, the interference background is created by transmissions from numerous MSs other than the one involved in the call. As such, these MSs transmit bursts with training sequences that are fixed for finite periods. However, call connections often utilize transmissions having a high degree of time stability. Consequently, for a particular desired signal, the same background interference signals can appear and be measured for a plurality of measurement periods, which degrades both timing and synchronization accuracy. In this context, the background interference is referred to as correlated.

A special application of the above-described time synchronization approaches is in the mobile positioning field for TDMA cellular systems. For example, if a MS's transmissions containing synchronization sequences are measured at a plurality of base stations, the time of arrival (TOA) or time difference of arrival (TDOA) of the received signals can be used, along with certain timing information and information about the geographical locations of the base stations, in order to estimate the MS's position.

Essentially, at a common measurement instant, numerous base stations measure the arrival time of a signal received from the MS whose position is to be determined. A central computing function converts the different arrival times of the MS's signal to distances, and calculates the results to determine the position of the MS. The precision in this method is determined primarily by the exactness of the burst arrival time at each base station, with respect to a common time reference. Also, measuring the TOA or TDOA of the MS's transmissions at as many base stations as possible improves the positioning accuracy, especially in strong multipath environments. As such, in order to be able to increase the number of base stations that can be used to make valid TOA or TDOA measurements from a MS's transmissions, it is highly desirable to be able to utilize multiple transmissions and signal combining techniques in order to enhance measurement sensitivity and thus precision. However, a problem with the existing time-synchronization measurement approaches is that they provide no means for generating background signal levels that can enhance performance by combining the signals from multiple independent measurements of desired signal sequences. As described in detail below, the present invention successfully resolves this problem and other related problems.

SUMMARY OF THE INVENTION

In accordance with a preferred embodiment of the present invention, a method is provided for decorrelating background interference in a TDMA cellular system, in which a MS inserts a different training sequence in each successive transmitted burst. The constantly varying background interference signal environment that results can be decorrelated at the receiver, which enhances the reception of multiple independent MS transmissions, and thus increases the sensitivity and precision of time-synchronization measurements, such as, for example, TOA or TDOA measurements made for MS positioning purposes.

An important technical advantage of the present invention is that it provides a method for generating background signal levels that can enhance performance by combining the signals from multiple independent measurements of desired signal sequences.

Another important technical advantage of the present invention is that it provides a method for using multiple transmitted bursts to enhance measurement accuracy in a MS positioning system.

Yet another important technical advantage of the present invention is that it provides a method for increasing the sensitivity and precision of time-synchronization measurements, such as, for example, TOA or TDOA measurements made for MS positioning purposes.

Still another important technical advantage of the present invention is that it provides a method for decorrelating background interference in a time-synchronized mobile communications system.

BRIEF DESCRIPTION OF THE DRAWINGS

A more complete understanding of the method and apparatus of the present invention may be had by reference to the following detailed description when taken in conjunction with the accompanying drawings wherein:

FIG. 1 is a simplified block diagram that shows a plurality of radio base stations and a MS in an exemplary time-synchronized cellular network, which can be used to implement a preferred embodiment of the present invention;

FIG. 2 is an example of a "normal" burst that can be used to implement the present invention; and FIG. 3 is a diagram that shows a plurality of bit sequences that can be used to implement the present invention.

DETAILED DESCRIPTION OF THE DRAWINGS

The preferred embodiment of the present invention and its advantages are best understood by referring to FIGS. 1–3 of the drawings, like numerals being used for like and corresponding parts of the various drawings.

Essentially, a method is provided for decorrelating background interference in a TDMA cellular system, in which a MS inserts a different training sequence in each successive transmitted burst. The varying background interference signal environment that results can be decorrelated at the receiver, which enhances the reception of multiple independent MS transmissions, and thus increases the sensitivity and precision of time-synchronization measurements, such as, for example, TOA or TDOA measurements made for MS positioning purposes.

Specifically, FIG. 1 is a simplified block diagram that shows a plurality of radio base stations (RBSs) 12, 14, 16, 18, and a MS 20 in an exemplary time-synchronized cellular network 10, which can be used to implement a preferred embodiment of the present invention. The cellular network 10 is described herein as a Global System for Mobile Communications (GSM) network for illustrative purposes only. However, the present invention can be implemented as well in any type of time-synchronized (e.g., TDMA) system that uses training sequences or sequences of bits in an MS's transmitted bursts, which are known to the network base station's receiver and enable the receiver to estimate or model a channel to which the receiver can adapt.

Preferably, the MS 20 transmits respective "normal" bursts on a traffic channel (TCH in the GSM) over a radio air interface to the network RBS's 12, 14, 16, 18. In the GSM, a "normal" burst is used to carry information (data or speech) on the TCH and certain control channels. In this embodiment, the TOA or TDOA measurements used for determining the position of a MS are based on the base stations' receipt of a "normal" burst from the MS on the respective TCHs. An example of such a "normal" burst is shown in FIG. 2.

In the GSM, a "normal" burst transmitted by an MS includes two 1-bit sets of Tail Bits (TBs), two 57-bit sets of encrypted data or speech, two 1-bit "stealing flags", and one 26-bit training sequence. The TBs are each composed of "000", which provide the equalizer algorithms in the RBS receivers with a known starting/stopping point. The 1-bit "stealing flags" indicate whether or not the burst has been "stolen" for Fast Associated Control Channel (FACCH) signalling purposes.

Notably, for time-synchronized or TDMA cellular systems other than the GSM, the format and arrangement of the bit sequences in the MS burst used for measurements can be different than, or the same as, the conventional "normal" burst transmitted by MSs in the GSM. As such, the important aspect of the present invention is that a known training sequence or similar known bit sequence is utilized in a MS's transmitted bursts, in a way that can be used by the base station receivers to decorrelate and combine the multiple background interference signals. In accordance with the present invention, the training sequences transmitted by a MS for measurement purposes (e.g., positioning measurements) are changed in each successive burst, which results in a constantly varying background interference signal environment (i.e., decorrelated).

For example, FIG. 3 is a diagram that shows an exemplary plurality of bit sequences (e.g., training sequences) that can be used to implement the present invention. As shown, in accordance with the aspect of primary importance for the present invention, each bit sequence (e.g., transmitted in a MS's "normal" burst on a GSM TCH) is different than the previous one. In this embodiment, the MS 20 generates the bit sequences shown and transmits each one in a "normal" burst preferably for the duration of a special application, such as, for example, MS positioning measurements to be made by at least three of the RBSs 12, 14, 16, 18. At the conclusion of the special (e.g., measurement) period, the MS 20 can resume the transmission of bursts with conventional bit sequences (i.e., transmitting the same training sequence for a finite duration). In this way, the useful signal from the MS of interest (20) is more variable in comparison with the background interference, which facilitates decorrelation of the background interference signals at the RBSs 12, 14, 16, 18.

Alternatively, the MS 20 can randomly select each bit sequence from the plurality of available bit sequences, and transmit each burst with the randomly selected bit sequence. In this way, the useful signal from the MS of interest is more variable in comparison with the background interference on a continuous basis, and the general background interference environment is randomized.

In a second embodiment of the present invention, the use of a constantly varying bit sequence known to the base station receiver in a MS's burst transmissions can improve the likelihood of signal enhancement by combining the multiple received signals used for time-synchronized measurements, if a bit sequence different from that for a "normal" burst is used. For example, in this embodiment, a training sequence used in a random access burst can be transmitted by the MS and used for positioning measurements. In the GSM, an "access" burst includes a 41-bit training sequence (longer than in a "normal" burst, in order to increase the probability of demodulation), 36 bits of information, and 7 and 3 TBs, respectively, at the leading and lagging ends. In this embodiment, the MS 20 can transmit a series of such "access" bursts, in which each training sequence is different than the previous one. This approach can be valid, for example, for MS positioning measurements that appear against the background interference environment for "normal" burst transmission channels.

As a complement to the present invention and method, the variability of the interference background can be further increased by the use of slow frequency hopping, which can be implemented, for example, in the GSM. With this approach, the MS of interest changes frequency between successive bursts, in addition to changing the training sequences. By using different frequency changing programs in different MSs, a highly variable signal environment can be created, which can further increase the decorrelation of the environment.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for facilitating decorrelation of background interference signals in a base station receiver of a time-synchronized mobile communications system, comprising the steps of:

a mobile station generating a plurality of bursts including at least a first type of bursts, each burst of said plurality of bursts including an associated training sequence known to said base station receiver; and said mobile station transmitting said plurality of bursts, wherein each successive burst of said first type of burst has a different associated training sequence.

2. The method of claim 1, wherein said time-synchronized mobile communications system comprises a TDMA cellular system.

3. The method of claim 1, wherein said time-synchronized mobile communications system comprises a GSM.

4. The method of claim 1, wherein said time-synchronized mobile communications system comprises a Digital-Advanced Mobile Phone System.

5. The method of claim 1, wherein said time-synchronized mobile communications system comprises a Personal Digital Cellular System.

6. The method of claim 1, wherein said time-synchronized mobile communications system comprises a Personal Communications System.

7. The method of claim 1, wherein said time-synchronized mobile communications system comprises a cellular communications system.

8. The method of claim 1, wherein each said associated training sequence is randomly selected.

9. The method of claim 1, further comprising the step of slow frequency hopping said plurality of bursts.

10. The method of claim 1, further comprising the steps of:

said base station receiver measuring an arrival time for each of said plurality of bursts; and estimating a geographical position of said mobile station from at least said measured arrival time.

11. A system for facilitating decorrelation of background interference signals in a base station receiver of a time-synchronized mobile communications system, comprising:

a mobile station, said mobile station including:

means for generating a plurality of bursts including at least a first type of bursts, such that each burst of said plurality of bursts includes an associated training sequence known to said base station receiver; and means for transmitting said plurality of bursts, coupled to said means for generating, such that each successive burst of said first type of burst has a different associated training sequence.

12. The system of claim 11, wherein said time-synchronized mobile communications system comprises a TDMA cellular system.

13. The system of claim 11, wherein said time-synchronized mobile communications system comprises a GSM.

14. The system of claim 11, wherein said time-synchronized mobile communications system comprises a Digital-Advanced Mobile Phone System.

15. The system of claim 11, wherein said time-synchronized mobile communications system comprises a Personal Digital Cellular System.

16. The system of claim 11, wherein said time-synchronized mobile communications system comprises a Personal Communications System.

17. The system of claim 11, wherein said time-synchronized mobile communications system comprises a cellular communications system.

18. The system of claim 11, wherein said mobile station randomly selects each said associated training sequence.

19. The system of claim 11, wherein a transmission of said plurality of bursts is slow frequency hopped.

20. The system of claim 11, wherein said base station receiver comprises:

means for measuring an arrival time for each of said plurality of bursts; and means, coupled to said means for measuring, for estimating a geographical position of said mobile station from at least said measured arrival time.

21. The method of claim 1, wherein said plurality of bursts further includes at least a second type of bursts, and each successive associated training sequence of said second type of bursts is different.

22. The system of claim 11, wherein said plurality of bursts further includes at least a second type of bursts, and each successive associated training sequence of said second type of bursts is different.

23. The method of claim 1, wherein said successive bursts are transmitted as part of a mobile station positioning measurement.

24. The system of claim 11, wherein said successive bursts are transmitted as part of a mobile station positioning measurement.

25. The method of claim 1, wherein said successive bursts include at least three successive bursts.

26. The system of claim 11, wherein said successive bursts include at least three successive bursts.

* * * * *